(12) United States Patent
Zhang et al.

(10) Patent No.: US 9,906,333 B2
(45) Date of Patent: Feb. 27, 2018

(54) IN-FRAME ACKNOWLEDGMENTS AND RETRANSMISSIONS

(75) Inventors: Jiansong Zhang, Beijing (CN); Kun Tan, Beijing (CN); Yongguang Zhang, Beijing (CN); Ranveer Chandra, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 172 days.

(21) Appl. No.: 13/572,912

(22) Filed: Aug. 13, 2012

(65) Prior Publication Data

US 2014/0044038 A1    Feb. 13, 2014

(51) Int. Cl.
*H04L 1/18* (2006.01)

(52) U.S. Cl.
CPC .......... *H04L 1/1854* (2013.01); *H04L 1/1887* (2013.01); *H04L 1/1893* (2013.01)

(58) Field of Classification Search
CPC .......................... H04L 1/1858; H04L 43/0847
USPC ......................................................... 370/394
See application file for complete search history.

(56) References Cited

U.S. PATENT DOCUMENTS

| | | | |
|---|---|---|---|
| 7,079,550 B2 * | 7/2006 | Padovani et al. | 370/468 |
| 8,027,367 B2 | 9/2011 | Li et al. | |
| 8,705,456 B2 * | 4/2014 | Zeira | H04L 1/1671 370/329 |
| 2002/0086707 A1 | 7/2002 | Struhsaker et al. | |
| 2003/0043778 A1 | 3/2003 | Luschi et al. | |
| 2004/0258039 A1 | 12/2004 | Stephens | |
| 2005/0111416 A1 | 5/2005 | Ginzburg | |
| 2005/0165949 A1 * | 7/2005 | Teague | 709/236 |
| 2007/0049317 A1 | 3/2007 | Qi et al. | |
| 2008/0159362 A1 | 7/2008 | Gelbman et al. | |
| 2009/0031185 A1 * | 1/2009 | Xhafa | H04L 1/0013 714/751 |

(Continued)

FOREIGN PATENT DOCUMENTS

| | | |
|---|---|---|
| CN | 1953567 A | 4/2007 |
| CN | 102017508 A | 4/2011 |

(Continued)

OTHER PUBLICATIONS

"International Search Report & Written Opinion for PCT Patent Application No. PCT/US2013/053537", dated Oct. 30, 2013, 10 Pages.

(Continued)

*Primary Examiner* — Shukri Taha
(74) *Attorney, Agent, or Firm* — Jacob P. Rohwer; Newport IP, LLC (57) ABSTRACT

Implementations for retransmitting erroneous portions within a transmission frame are described. A sender transmits a transmission frame and the receiver performs error detection on portions of the transmission frame in order to determine if any are received in error. The receiver sets up a feedback channel and transmits acknowledgements to the receiver to indicate that one or more portions have been received and to identify any portions that are received with errors. At least some of the acknowledgements are transmitted prior to receipt of the entire transmission frame. The sender retransmits any portions that are identified as being erroneous within the transmission frame.

17 Claims, 4 Drawing Sheets

(56) References Cited

U.S. PATENT DOCUMENTS

| 2009/0201825 | A1 | 8/2009 | Shen et al. | |
| 2009/0271680 | A1* | 10/2009 | Tanigawa et al. | 714/748 |
| 2009/0274139 | A1* | 11/2009 | Palanki | 370/349 |
| 2010/0157893 | A1* | 6/2010 | Lee | H04L 1/06 370/328 |
| 2011/0164623 | A1* | 7/2011 | Huang | H04L 5/003 370/474 |
| 2011/0222452 | A1 | 9/2011 | Jeong et al. | |
| 2011/0237282 | A1 | 9/2011 | Geirhofer et al. | |

FOREIGN PATENT DOCUMENTS

| CN | 102158329 A | 8/2011 |
| CN | 102474886 A | 5/2012 |

OTHER PUBLICATIONS

Kuo, et al., "A Fragment Based Retransmission Scheme with QoS Considerations for Wireless Networks", In Proceedings of the International Conference on Wireless Communications and Mobile Computing, Aug. 16, 2007, 6 Pages.

Jamieson et al., "PPR: partial packet recovery for wireless networks", SIGCOMM'07, Aug. 2007, Kyoto, Japan, 12 pages.

Makharia et al., "Experimental Study on Wireless Multicast Scalability using Merged Hybrid ARQ with Staggered Adaptive FEC", Proceedings of the IEEE International Symposium on a World of Wireless, Mobile and Multimedia Networks, Jun. 23, 2008, 12 pages.

Nanda et al., "A High-Performance MIMO OFDM Wireless LAN", IEEE Communication Magazine, published vol. 43, No. 2, Feb. 2005, 9 pages.

Sen et al., "CSMA/CN: carrier sense multiple access with collision notification", MobiCom'10, Sep. 2010, Chicago, Illinois, 12 pages.

"Office Action and Search Report Issued in Chinese Patent Application No. 201380043230.X", dated Feb. 2, 2017, 10 Pages.

"Second Office Action and Search Report Issued in Chinese Patent Application No. 201380043230.X", dated Oct. 20, 2017, 12 Pages.

* cited by examiner

IN-FRAME ACKNOWLEDGMENTS AND RETRANSMISSIONS

BACKGROUND

In conventional wireless networks, unrecoverable symbol errors result in retransmission of frames. Frame retransmissions reduce the efficiency of a data communication system due to media contention overhead, retransmission of packet headers and preamble, and retransmission of some data that was correctly received. In a typical IEEE 802.11g implementation, header overhead can add up to 52 μs of delay. Additionally, the acknowledgement timeout (the time that the receiver waits for a frame acknowledgement from the sender before retransmitting the frame), media contention, and frame retransmission all add delay. Applications suffer performance degradation as a result. There has been some attempt to address the inefficiency of frame retransmission, in particular by retransmitting only the erroneous bits in a retransmission frame.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present disclosure utilize in-frame retransmissions of erroneous portions of the frame to increase efficiency. A receiver uses a feedback channel to transmit acknowledgements (ACKs) for a portion of the transmission frame. The sender monitors the feedback channel and retransmits any negatively acknowledged portions within the same frame, rather than in a new retransmitted frame.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, frame retransmissions in conventional wireless systems are inefficient. Embodiments of the present disclosure utilize in-frame retransmissions of erroneous portions of the transmission frame, such as for example erroneous symbols, to increase efficiency. A sender uses a feedback channel to transmit acknowledgements (ACKs) for a portion or portions of the transmission frame. The receiver monitors the feedback channel and retransmits any negatively acknowledged portions within the same frame, and rather than in a new retransmitted frame. Retransmitting erroneous portions within the same frame that they were originally transmitted increases efficiency. Because erroneous portions are retransmitted within the same frame, there is no need for the transmitter to re-contend for the media, and there is no need for the transmitter to retransmit full preambles and headers. Rather, the sender inserts new copies of negatively acknowledged portions into the frame during transmission of the frame.

Embodiments described herein refer to in-frame acknowledgments and retransmissions of symbols or groups of symbols within the context of orthogonal frequency-division multiplexing (OFDM) wireless systems. But this is for ease of description only. Embodiments are not limited to retransmitting symbols and OFDM wireless systems unless explicitly stated. Embodiments are also not limited to wireless systems that transmit symbols unless explicitly stated. Other types of wireless systems may be utilized without departing from the scope of embodiments.

The processes, systems, and devices described herein may be implemented in a number of ways. Example implementations are provided below with reference to the following figures.

Example Environment

Figure 1:
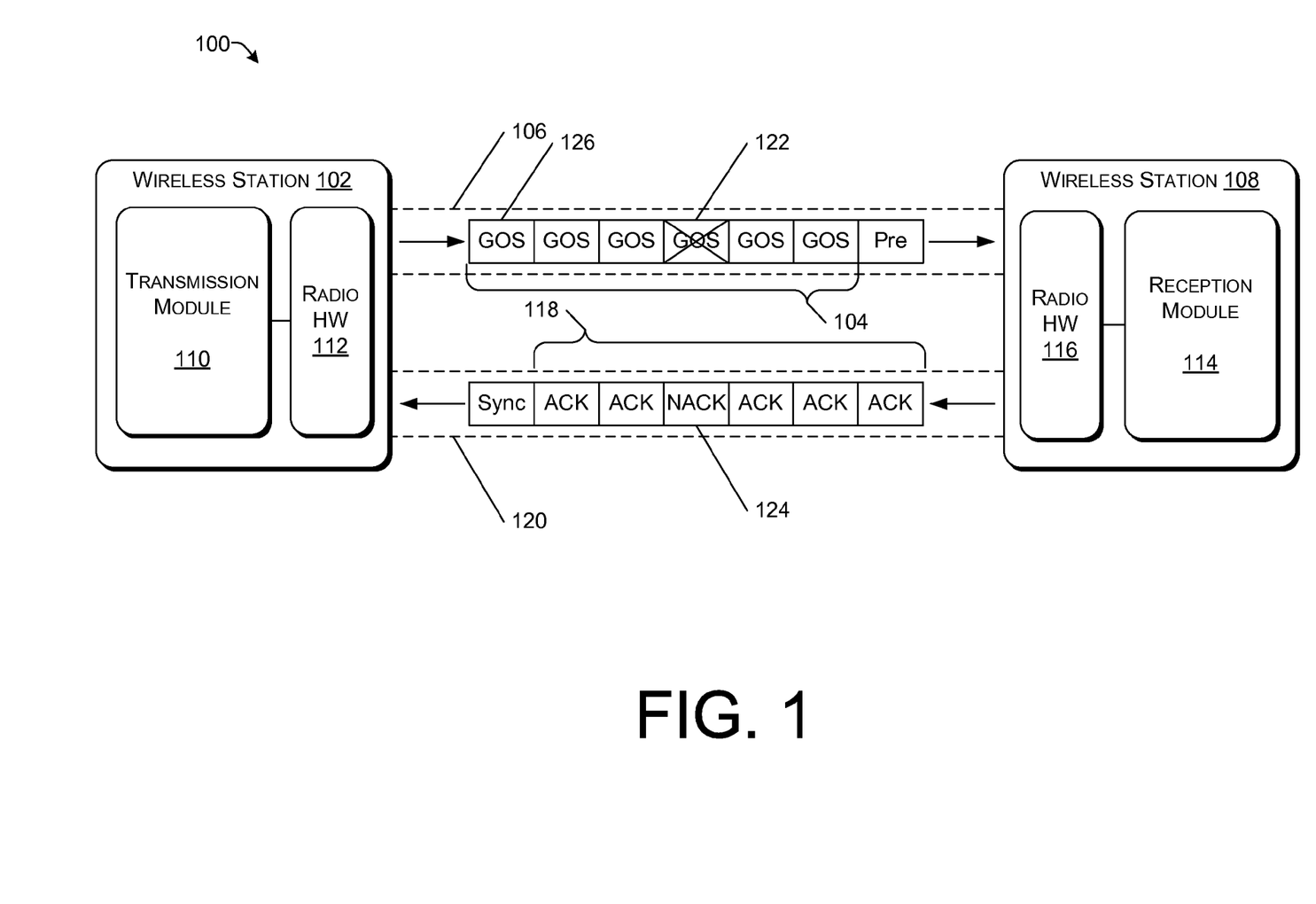
FIG. 1 is a block diagram of an example environment for acknowledging groups of symbols on a feedback channel.

FIG. 1 is a block diagram of an example environment 100 for acknowledging groups of symbols on a feedback channel. A wireless station 102 transmits a transmission frame 104 on a feed-forward channel 106 to a wireless station 108. The wireless station 102 includes a transmission module 110, as well as radio hardware 112. The wireless station 108 includes a reception module 114, as well as radio hardware 116. FIG. 1 depicts transmission of a frame from the wireless station 102 to the wireless station 108 for the sake of illustration only. But transmission frames may also be transmitted on the same or different feed-forward channel in the opposite direction. Thus, the wireless station 102 may include a reception module and the wireless station 108 may include a transmission module to enable the wireless station 108 to transmit frames to the wireless station 102.

The transmission module 110 performs various functions—including generating frames for transmission on the feed-forward channel 106—while the reception module 114 performs various functions including reconstructing the transmitted frame and passing the frame data to the higher layers of the protocol stack. The radio hardware 112 encodes the transmission frame 104 for transmission on the feed-forward channel 106. The transmission frame 104 is preceded by a preamble (PRE) and includes a plurality of groups of symbols (GOS). In embodiments, a single GOS may be one or more sequentially transmitted symbols that result from the encoding of the data of the transmission frame 104.

The wireless station 108, after synchronizing to the preamble in the transmission frame 104, initiates a feedback frame 118 to the sender in a feedback channel 120. The feedback channel 120 may be narrower than the feed-forward channel 106 as is described in more detail below.

The wireless station 108 decodes each incoming data symbol of the transmission frame 104 and dynamically determines whether the symbols are correct or in error. For each GOS that is successfully received, the wireless station 108 will send an acknowledgment (ACK) to the wireless station 102; otherwise, if erroneous symbols are detected within a GOS, a negative acknowledgment (NACK) is sent. The ACKs and NACKs are transmitted to the wireless station 102 using the feedback channel 124, which is synchronized to the feed-forward channel 106. After all of the data symbols have been transmitted, the wireless station 102 re-encodes the symbols of the negatively acknowledged GOSs and inserts the retransmission GOSs to the frame, such as after the last non-retransmission data symbol (although other placements within the transmission frame are possible without departing from the scope of embodiments). The wireless station 102 continually re-encodes the lost (erroneous) symbols until it receives an acknowledgment of the entire frame from the receiver or after a predefined maximum limit is reached, such as after a predetermined period of time, predetermined number of symbols is transmitted, after a certain number of bytes have been transmitted, and so forth.

In the example shown in FIG. 1, the third GOS in transmission frame 104—GOS 122—is shown with an "X" through it to indicate that it is received with an error, such as an error that cannot be recovered without retransmission. For example, an error that requires retransmission to recover may be one that cannot be corrected using error correction techniques, such as by the decoder within the radio hardware 116. The radio hardware 116 transmits ACKs to acknowledge the correctly received GOSs, and transmits a NACK 124 to indicate that the GOS 122 was received with an error. Responsive to the NACK 124, the wireless station 102 then appends GOS 126, which is a retransmission of the GOS 122, to the end of the transmission frame 104. When the entire transmission frame 104 is correctly received, i.e., when the entire transmission frame 104 passes cyclic redundancy check (CRC), the wireless station 108 will send back an end-of-stream (EOS) symbol to the wireless station 102, which, upon receiving the EOS symbol, terminates the transmission of transmission frame 104.

The radio hardware 112 and 116 may include a multi-radio architecture in order for a receiver (such as the wireless station 108) to send fine-grain feedback to a sender (such as the wireless station 102) while simultaneously receiving data symbols from the sender. A transmit radio and a receive radio may be integrated into a single board in order to synchronize them at the micro-second level in order to better provide timely feedback to the sender. The receiver receives the data symbols in the wideband feed-forward channel 106 and, based on the decoding results, dynamically modulates and sends ACKs and NACKs in real-time using the narrow-band feedback channel 120. As noted above, the sender re-encodes and sends the erroneous symbols in real-time based on the received feedback.

The more fine-grained the feedback (e.g., the smaller the GOS), the fewer redundant symbols will be retransmitted upon receipt of a NACK. For example, if one ACK or NACK is sent for each single symbol (in other words, where a GOS includes only one symbol), no correctly received symbols would ever be retransmitted; only erroneous symbols would be retransmitted. This improves the efficiency of the feed-forward channel 106. However, using relatively fine granularity (such as a GOS with only a single symbol) requires more bandwidth on the feedback channel 120 than if larger GOSs were used. Also, relatively fine granularity may not be necessary in embodiments since wireless errors are usually bursty: bits transmitted within the coherent time usually share the same channel state and are lost in one burst, and therefore may be acknowledged with one ACK or NACK symbol without much or any loss of performance. The coherence time depends on the speed of multi-path fading in the wireless channel. In an indoor environment, the multi-path fading varies from around 100 µs (fast fading) to tens of milliseconds (slow fading), although other fading times are possible.

In one example, an ACK or NAK is sent every 20 µs, which is much shorter than the coherence time in a common indoor wireless channel. This period of time would be sufficient to transmit five 802.11 orthogonal frequency-division multiplexing (OFDM) symbols. In theory, a receiver may need to convey only one bit of information (i.e., the GOS was received correctly or with error) for every GOS it receives. Thus, the feedback channel may have a relatively narrow bandwidth. In this example, the baud rate for the feedback is $\frac{1}{20}$ µs=50 KHz. Even with a 100% guard-band, this represents only around 0.5% overhead of a 20 MHz WiFi channel. In other embodiments, additional bits are used in an ACK or NACK symbol in order to ensure sufficient proper coding for reliability. Thus, the bandwidth of the feedback channel 120 may be 1 MHz, in one example: the feedback signal may have a width of 500 KHz and another 500 KHz spectrum may serve as a guard-band. A 500 KHz guard-band can be implemented according to the (Digital Enhanced Cordless Telecommunications) DECT standard, which deploys a guard-band of 576 KHz with a channel width of 1.728 MHz. Other guard band sizes and types may be used without departing from the scope of embodiments.

Compared to conventional 802.11 protocols, the feedback channel 120 in this example adds approximately 5% of overhead to the system. But the feedback channel 120 obviates the need for a conventional ACK frame (which acknowledges receipt of the entire frame) and thereby reduces the time-domain overhead. For example, where a frame size is 1500 bytes in a conventional 802.11 transmission, a conventional ACK frame normally takes approximately 8% overhead when the modulation rate is 24 Mbps, which is comparable to the feedback channel overhead in this example (5%). At higher data rates, which involve wider channels (for example, a 40 MHz channel such as is used in IEEE 802.11n), the feedback channel 120 overhead would decrease reciprocally while the overhead of a conventional ACK frame increases (e.g., 20% with 300 Mbps rate) due to the shorter transmission time of data symbols at higher bandwidth.

The ACK and NACK symbols may utilize a relatively robust code and modulation scheme to ensure sufficient reliability of the feedback. The symbol time of the feedback is equal to the duration of a GOS, which in the above example is 20 µs. In an example embodiment utilizing a 500 KHz signal bandwidth, each feedback symbol may be coded into 10 chips. In one example, four bits are mapped to one feedback symbol and these bits are encoded into 10 chips, each of which may be modulated using basic differential binary phase-shift keying (DBPSK). The feedback frame 118 may be preceded with 20 µs synchronization (Sync) symbol that allows the wireless station 102 to detect and synchronize to the feedback frame.

The reception module 114 detects erroneous symbol groups in order to generate real-time fine-grained feedback. This could be done in several ways. In one embodiment, the transmission frame 104 is split into fragments and CRC check sequences are inserted for each fragment by the wireless station 102, and the reception module 114 utilizes the CRC check sequences to detect errors. The overhead to transmit these check sequences increases proportionally with the number of fragments in a frame, which may be equal to the number of GOSs in the frame.

In another embodiment, physical layer (PHY) hints are used to classify correct or erroneous symbols. These PHY hints may use the soft output of the channel decoder, such as the soft-output of a Viterbi decoder with a modulation rate of 24 Mbps. While PHY hints avoid the overhead of checksums, the PHY hint-based classifier may be less reliable when the signal-to-noise ratio (SNR) is just enough to support the modulation rate on the wireless link. It is not uncommon for a wireless link to work at this marginal SNR regime, since conventional rate adaptation mechanisms tend to choose the highest modulation rates for better efficiency. Thus, CRC may be more efficient.

A side channel may be employed to transmit CRC information in order to avoid the overhead associated with inserting CRC checksums between fragments in the transmission frame 104. Current 802.11 PHY standards deploy four pilot subcarriers in each OFDM symbol, each of which transmits dummy bits. These dummy bits carry no information and are used by the receiver to track channel changes. In embodiments, one bit of information on each pilot subcarrier is modulated without significantly reducing the channel tracking performance. Specifically, let $P_{i,j}$ denote the known pilot sequence for symbol i on pilot subcarrier j. Then, instead of inserting $P_{i,j}$, the sender sends $P'_{i,k}=c_k P_{i,j}$, where $c_k=\{1, -1\}$ is a differentially coded binary data. The receiver, however, decodes $c_k$ first, before performing normal pilot tracking. To decode $c_k$, the receiver uses the pilot value of the previous symbol, $P'_{(i-1),j}$, as a reference, which is similar to a differential demodulation. A group of $c_k$s can further be protected with error-correction codes, and small number of bit errors may not affect the correctness of $c_k$. Once $c_k$ is decoded, the receiver can recover $P_{i,j}$ and feed it to normal pilot tracking algorithms. This is referred to herein as decision-directed pilot tracking (DDPT).

DDPT does not significantly degrade tracking performance. Once $c_k$ is successfully decoded, DDPT is equivalent to a conventional dummy-bit pilot tracking (DBPT) scheme: once $c_k$ is decoded, the original pilot value $P_{i,j}$ can be directly recovered. Also, it is reasonable to use a previously received pilot value as a reference to demodulate $c_k$, since the wireless channel usually holds stable during the coherence time, which is from 100 µs to several milliseconds for indoor environment, such as for example in a WiFi network. The symbol period is about 4 µs which may be shorter than the channel coherence time. And even if there is a sudden interference causing erroneous detection of $c_k$, which is BPSK modulated with proper channel coding, then the original pilot tracking algorithm would likely fail decode, since the interference may also corrupt the tracking results. Therefore, the symbols, in either DDPT or DBPT, would suffer a strong interference in such a situation and would fail to decode anyway. Finally, to prevent the decision errors from propagating, DDPT is performed only within a GOS. For the first symbol in a GOS, normal pilot bits may be inserted, while modulating information only on the remaining symbols.

With DDPT, up to 16 bits may be embedded on the pilot subcarriers of a GOS. In embodiments a simple Hamming code is employed to protect this side-channel. Of the 16 bits, eleven can be used as information bits. Ten bits are used to encode a CRC-10 checksum, which is used in B-ISDN and ATM networks. The other bit is used to indicate whether or not the GOS may contain retransmission metadata used to identify a retransmission GOS. Upon decoding a GOS, the receiver computes a CRC-10 checksum of the decoded bits and compares it to the CRC checksum embedded in the pilot subcarriers. If the CRC checksums match, the receiver sends out a positive ACK; otherwise it sends a NACK.

The feed-forward channel 106 may be part of a wireless system, such as an OFDM system. Example wireless systems include WiFi, IEEE 802.11, Personal Area Networks (PANs) utilizing ultra-wideband, the 4G LTE (Long Term Evolution) standards, and others. Although embodiments are described herein as employing wireless communication, various wired transmission technologies could also be employed without departing from the scope of the present disclosure. For example, various digital subscriber line (DSL) technologies utilize OFDM and embodiments could be used in these wired technologies.

In embodiments, the feedback channel 120 may be established to have a similar range as the feed-forward channel 106. Otherwise, the hidden/exposed terminal problem may become more pronounced. To establish feedback and feed-forward channels with a similar range, both channels may be established within the same band, i.e. either 2.4 GHz or 5 GHz. Furthermore, the transmit power of the feedback channel 120 may be adjusted such that its range matches the feed-forward channel 106.

A transmission frame according to embodiments with a large number of bit errors will increase the size of the transmission frame and therefore occupy the medium for a longer period of time than if no GOS were retransmitted in the frame (such as in conventional 802.11). This may impact the performance of transmissions by other stations whose transmission links are more reliable. To address this, the transmission module 110 may enforce a maximum time limit or maximum number of symbols for a transmission frame, including GOS retransmissions. The transmission module 110 may also take measures to reduce the probability that a node immediately re-occupies the medium.

Example Computing Device

Figure 2:
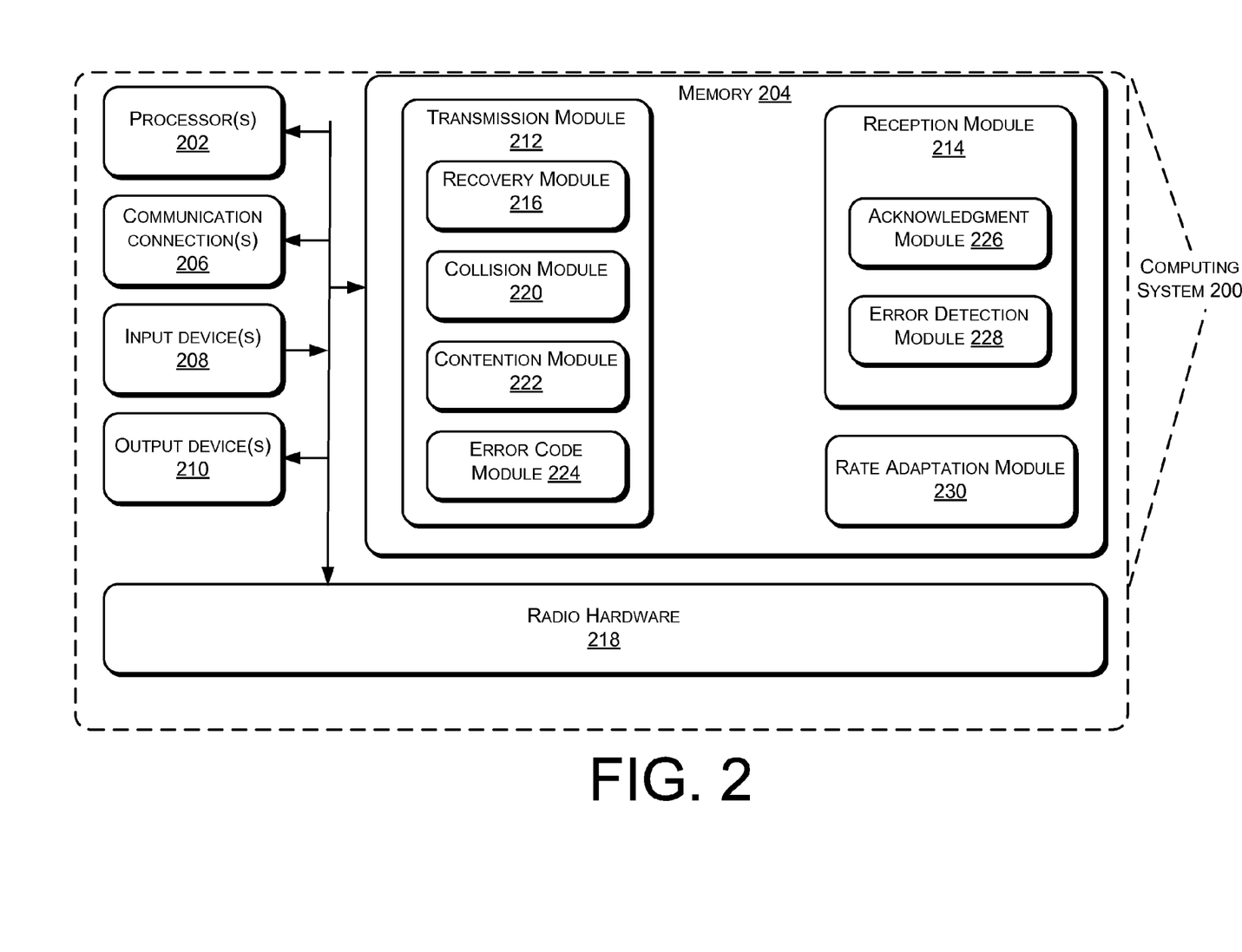
FIG. 2 is a block diagram of an example computing system usable to send and receive transmission frames according to embodiments.

FIG. 2 is a block diagram of an example computing system 200 usable to send and receive transmission frames according to embodiments. The computing system 200 may be configured as any suitable computing device capable of implementing all or part of an in-frame acknowledgement and retransmission system. According to various non-limiting examples, suitable computing devices may include personal computers (PCs), servers, server farms, datacenters, special purpose computers, tablet computers, game consoles, smartphones, routers, bridges, switches, combinations of these, or any other computing device(s) capable of storing and executing all or part of an in-frame acknowledgement and retransmission system.

In one example configuration, the computing system 200 comprises one or more processors 202 and memory 204. The computing system 200 may also contain communication connection(s) 206 that allow communications with various other systems. The computing system 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

The memory 204 may store program instructions that are loadable and executable on the processor(s) 202, as well as data generated during execution of, and/or usable in conjunction with, these programs.

The memory 204 may include a transmission module 212 and a reception module 214. The transmission module 212—which may be the same as or similar to the transmission module 110—performs various functions associated with transmitting frames, such as placing headers on frames, assembling data packets to include in frames and so forth. A recovery module 216—which may be included in the memory 204—is executable to cause retransmission of a group of one or more symbols of the transmission frame by the radio hardware on the feed-forward channel. In particular, the recovery module 216 causes retransmission of a GOS responsive to a NACK received by the transmission module 212 on a feedback channel that indicates that one or more symbols of the transmission frame were received with one or more errors. The recovery module 216 causes the group of one or more symbols to be inserted and retransmitted within the same frame in which they were originally transmitted. Retransmitting the group of one or more symbols within the same frame means that the group of one or more symbols is retransmitted without requiring transmission of a new preamble or frame headers, and without further media contention (beyond the media contention required to transmit the frame in the first place). In embodiments only a portion of a preamble is retransmitted. In such embodiments, a channel training portion at the beginning of a retransmission GOS(s) may be retransmitted, so that the receiver can retrain the wireless channel and facilitate the reception of retransmission GOS(s). A synchronization portion may be either transmitted or omitted.

The recovery module 216 is further executable to include metadata with the retransmission that identifies the group of one or more symbols. The metadata may be included within the frame itself or provided on a side-channel as is described elsewhere within this Detailed Description.

Radio hardware 218—which may be the same as or similar to the radio hardware 112 and 116—is configured to encode, modulate, and transmit transmission frames and feedback frames on a wireless system, such as on an OFDM system, including for example WiFi, 802.11 systems, 4G LTE systems, and so forth. The radio hardware 218 may include a multi-radio architecture, with a transmit radio and a receive radio tightly integrated to better provide timely feedback and/or to provide timely retransmissions of erroneous GOS within the transmission frames. The two radios may be tightly integrated in part by being provisioned on a single board. Alternatively, the two radios may be integrated into a single integrated circuit. In embodiments, single radio solutions may be utilized.

In embodiments, a narrow feedback channel is allocated for every feed-forward channel. For example, in the 2.4 GHz spectrum, the 11 MHz of feedback channels spectrum (one MHz for each of the 11 channels) may be allocated in the unused channels 12 and 13 of IEEE 802.11b. This spectrum is available worldwide, although mostly unused. In the USA it is only available for low-power operation, but given that the feedback channel is low bandwidth, and hence low power, using these channels for the feedback channel likely complies with FCC regulations regarding the use of these channels. In alternative embodiments, full-duplex technology is used for single radio designs for the feedback channel.

The transmission module 212 is executable to cause the radio hardware 218 to transmit a transmission frame, which may be preceded by transmission of a preamble, to a receiver on the feed-forward channel. The reception module 214 is executable to cause the radio hardware 218 to receive transmission frames transmitted to the computing system 200 on the feed-forward channel, and to acknowledge the receipt of GOSs of the transmission frame in real-time on the feedback channel.

The feedback channel may be utilized, in various embodiments, to detect a hidden terminal. For example, a collision module 220 is executable to cause the radio hardware to cease transmission of the transmission frame responsive to a failure to receive any acknowledgements from the receiver on the feedback channel. The transmission module 212 retries the transmission after a backoff time. The radio hardware 218 continually monitors the feedback channel, and the receiver will begin sending ACKs and NACKs after receiving the first GOS before the entire transmission frame is received. In normal operation, the radio hardware 218 would begin receiving ACKs or NACKS, and failure to receive more than a threshold number of ACKs or NACKs—or any ACKs/NACKS at all—indicates that the frame has collided with another terminal even where the collision is not detectable on the feed-forward channel, such a where there is a hidden terminal that is too far from the computing system 200 to be detectable on the feed-forward channel.

Also, a contention module 222 is executable to monitor the feedback channel for ACKs/NACKs to determine whether the feed-forward channel is available. If the feedback channel is being used to send an acknowledgement frame, then receipt of acknowledgements on the feedback channel addressed to another sender would be evidence that the feed-forward channel is being used by a terminal that is too far away to be detectable on the feed-forward channel. Thus, the contention module 222 may prevent the transmission module 212 from beginning transmission on the feed-forward channel even if the feed-forward channel appears silent to the radio hardware 218.

An error code module 224—which may be included in the memory 204—is executable by the one or more processors to determine an error detection code, such as a CRC checksum or PHY hint, for the one or more symbols and to cause the radio hardware to transmit the error detection code to the receiver. The error detection code may be transmitted within the transmission frame (such as interspersed between fragments of the transmission frame) or within PHY headers. Alternatively, the error detection code is transmitted in a side channel, as is described elsewhere within this Detailed Description.

The transmission module 212 embeds a PHY layer address inside the preamble, such as in an extended field of a Physical Layer Convergence Protocol (PLCP) header. The PHY layer address enables the receiver to determine upon receipt of the preamble that the transmission frame is addressed to itself, and can therefore immediately establish the feedback channel by transmitting a sync symbol. The PHY layer address may be dynamically determined.

An acknowledgement module 226—which may be include in the memory 204—of the reception module 214 is executable to acknowledge receipt of a group of less than all of the plurality of symbols on the feedback channel prior to receipt of all of the plurality of symbols. The acknowledgement is based on error detection by an error detection module 228, which makes an error detection determination. Receipt of a GOS with no errors results in transmission by the acknowledgement module 226 of a positive ACK corresponding to a GOS, and the receipt of an erroneous symbol results in transmission by the acknowledgement module 226 of a NACK corresponding to a GOS that includes the erroneous symbol.

An error detection module 228—which may be included in the memory 204—uses the error detection code to determine whether a symbol received in the feed-forward channel contains an error. This determination occurs prior to receipt of all of the plurality of symbols of the transmission frame, in order to enable the ACK/NACK to indicate whether the GOSs were received without error in time for the sender to retransmit erroneous GOSs during transmission of the transmission frame.

The reception module 214 will receive a retransmission GOS within the same transmission frame and will utilize retransmission metadata to identify the retransmission GOS. The reception module 214 is executable to insert a correctly received retransmission GOS into the correct location in the transmission frame and to pass the decoded and demodulated transmission frame up the protocol stack to ultimately reach an application. This enables the reception module 214 to receive retransmissions of erroneous symbols without having to wait for the sender to re-contend for the media, or to transmit a new preamble and transmission frame.

A rate adaptation module 230—which may be included in the memory 204—is executable to perform rate adaptation on one or more subcarriers of the feed-forward channel during transmission of the frame. This may be based on channel quality information included in the acknowledgment. In embodiments, the rate adaptation module estimates the bit error rate (BER) on the feed-forward channel at any time, and dynamically picks a rate for each symbol of the transmission frame based on this estimate of BER.

Example Operations

Figure 3:
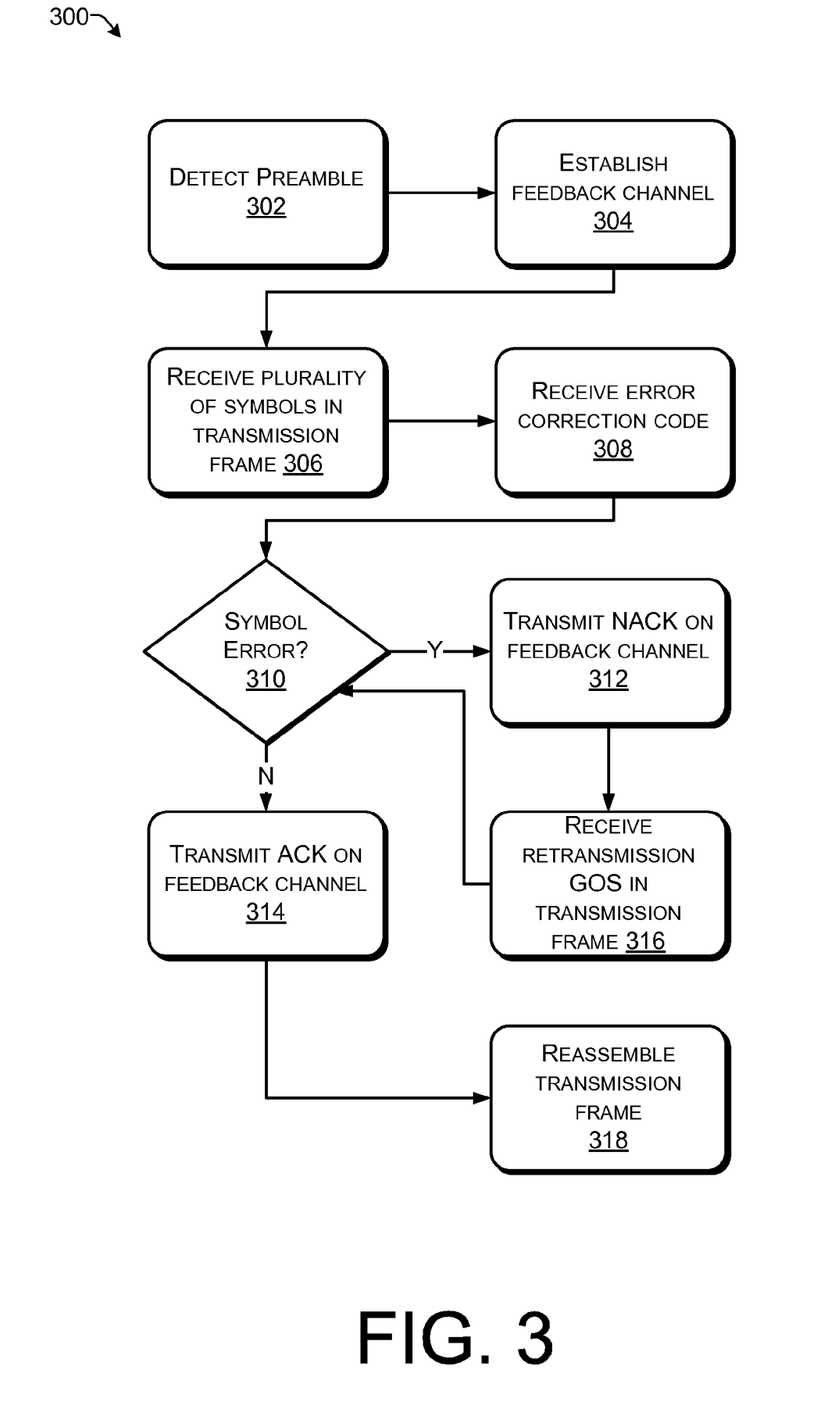
FIG. 3 is a flow diagram showing an example process for a receiver acknowledging receipt of symbols or groups of symbols and receiving retransmitted symbols or groups of symbols.

FIG. 3 is a flow diagram showing an example process 300 for a receiver acknowledging receipt of symbols or groups of symbols and receiving retransmitted groups of symbols. At 302, a receiver, such as the wireless station 108, detects a preamble of a transmission frame on a feed-forward channel of a wireless system. The preamble may include a PHY layer address or other indication that the transmission frame is addressed for the receiver.

At 304, the receiver establishes a feedback channel to the sender upon detecting the preamble. The feedback channel may be established by first sending a sync symbol to the sender on the feedback channel. Alternatively, the feedback channel may be pre-established prior to the receipt of the preamble. In various embodiments, the feed-forward channel and the feedback channel may utilize different frequencies bands or different time slots.

At 306, the receiver receives a plurality of symbols within the transmission frame on a feed-forward channel.

At 308, the receiver receives error detection codes, such as a CRC checksums, that correspond to the symbols in the transmission frame. The error detection codes may be transmitted within the transmission frames—such as interspersed between the symbols or groups of symbols—or via a side channel.

At 310, the receiver uses the error detection codes to determine whether a group of symbols contains one or more symbols with an error. The error check is performed in real-time, prior to receiving all of the symbols of the transmission frame. The radio hardware may attempt to recover from an error upon receipt, but if this is not possible, the receiver requests a retransmission. All correctly received data are kept in an assembly buffer.

At 312, when a symbol error is detected at 310 (following the "y" route), the receiver transmits a NACK on the feedback channel to indicate that a particular GOS is received with one or more errors. At 314, when a symbol error is not detected at 310 (following the "n" route), the receiver transmits an ACK on the feedback channel to acknowledge receipt of a GOS, and to indicate that the GOS is received without errors. If all GOS are received correctly, the receiver transmits an EOS symbol to the sender. At least some of the ACK/NACKs are transmitted prior to receipt of all of the plurality of symbols.

At 316, the receiver receives a retransmission GOS in the transmission frame. The retransmission GOS corresponds to a GOS that was negatively acknowledged in the feedback channel as being received with an error. The retransmission GOS will also be checked for errors, and a NACK or ACK transmitted to the receiver based on the error check. Correctly received retransmission GOS data is stored in the reassembly buffer.

At 318, the transmission frame is reassembled. Retransmission metadata, received either in the transmission frame or via a side channel, is used to identify and reorder the symbols prior to reconstruction.

Figure 4:
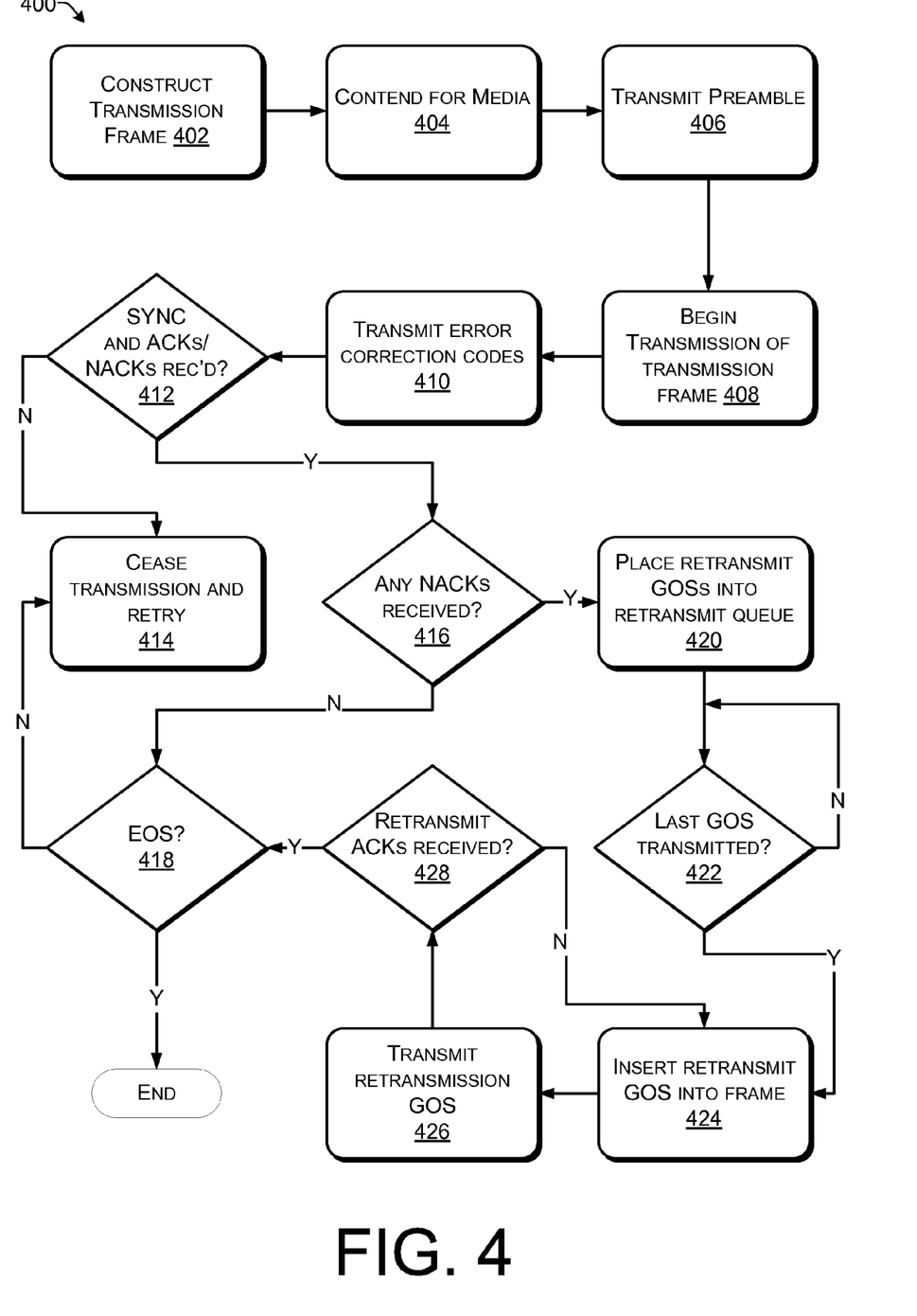
FIG. 4 is a flow diagram showing an example process for a sender receiving acknowledgements for symbols or groups of symbols and retransmitting erroneous symbols or groups of symbols.

FIG. 4 is a flow diagram showing an example process 400 for a sender receiving acknowledgements for symbols or groups of symbols and retransmitting erroneous symbols or groups of symbols. At 402, the sender—such as the wireless station 102—constructs a transmission frame for transmission on a feed-forward channel.

At 404, the radio hardware of the sender contends for the transmission media. At 406, upon successfully determining that the media is available, the sender transmits a preamble to the receiver on the feed-forward channel. The preamble may include a PHY address to let the receiver know that the transmission frame is addressed to it.

At 408, the sender codes, modulates, and begins transmission of the transmission frame on the feed-forward channel to the sender. At 410, the sender transmits error detection codes, such as a CRC checksum, to the receiver. The error detection codes may be transmitted within the transmission frame or via a side channel.

At 412, the receiver determines whether a feedback sync symbol to establish the feedback channel and/or any ACKs/NACKs are received from the receiver. If, after a timeout period none are received, the sender at 414 (following the "n" route), ceases transmission and retries at a later time. Not receiving a feedback sync symbol or any ACKs/NACKs may indicate that the transmission has collided with another transmission.

At 416, (following the "y" route), the sender determines whether the acknowledgements received are NACKs—that is whether one or more received acknowledgements indicate that the receiver received the GOS with at least one symbol error. Upon a determination that no acknowledgements are NACKs, the sender will determine at 418 (following the "n" route), whether the sender has transmitted an EOS. If an EOS is transmitted, indicating that the transmission frame is completely and correctly received, the process ends. In the special case where no ACK or EOS symbols are ever received, the sender marks the entire frame as lost and retries, at 414.

At 420 (following the "y" route), upon a determination that one or more of the acknowledgements is a NACK, the sender places corresponding retransmission GOSs into a retransmission queue. The sender may also append retransmission metadata to the retransmission GOSs, although in embodiments, retransmission metadata may be sent in an alternative manner, such as via a side-channel.

At 422, the sender determines whether the sender has transmitted the last GOS of the transmission frame. Once the last GOS has been transmitted, at 424 (following the "y" route), the sender begins fetching the retransmission GOSs from the retransmit queue and inserts them one at a time into the transmission frame. The sender also determines whether a maximum number of symbols have been transmitted in the frame. If so, then the process ends. Setting a maximum number of symbols prevents the sender from occupying more than a predetermined amount of time on the transmission media. In the same or alternative embodiments, a maximum transmission time limit may be enforced.

At 426, the retransmission GOSs are transmitted directly after the last GOS is sent. The sender transmits the retransmission GOSs as part of the same frame that the originally transmitted, erroneous, GOSs were transmitted in. If the retransmission GOSs are all acknowledged with ACKs at 428, then the transmission ends. Otherwise, any negatively acknowledged retransmission GOSs are reinserted into the transmission frame as long as maximum number of symbols has not been transmitted.

FIGS. 3 and 4 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Computer-Readable Media

Depending on the configuration and type of computing device used, the memory 204 of the computing system 200 in FIG. 2 may include volatile memory (such as random access memory (RAM)) and/or non-volatile memory (such as read-only memory (ROM), flash memory, etc.). The memory 204 may also include additional removable storage and/or non-removable storage including, but not limited to, flash memory, magnetic storage, optical storage, and/or tape storage that may provide non-volatile storage of computer-readable instructions, data structures, program modules, and other data for the computing system 200. The instructions stored on the memory 204 may be, for example, firmware or other software that is tightly integrated with the radio hardware 218.

The memory 204 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A system, comprising:
   radio hardware to contend for transmission media for transmitting a transmission frame with a frame header to a receiver on a feed-forward channel and to receive acknowledgements from the receiver on a feedback channel, wherein the feed-forward channel and the feedback channel are different;
   one or more processors; and
   one or more modules executable by the one or more processors to:
   receive a negative acknowledgement from the receiver on the feedback channel, the negative acknowledgement indicating that a portion of data within the transmission frame received by the receiver has an error, the negative acknowledgement received prior to an entirety of the transmission frame being transmitted by the radio hardware on the feed-forward channel; and
   cause, prior to the radio hardware transmitting the entirety of the transmission frame, the radio hardware to retransmit the portion of data within the transmission frame on the feed-forward channel without requiring the radio hardware to re-contend for the transmission media and while refraining from generating and transmitting a new frame header.

2. The system of claim 1, wherein the one or more modules are further executable to cause the radio hardware to retransmit the portion of data while refraining from generating a new preamble.

3. The system of claim 1, wherein the portion of data includes a group of one or more symbols, and the one or more modules are further executable to cause the radio hardware to transmit metadata that identifies the group of one or more symbols as being a retransmission of the group of one or more symbols.

4. The system of claim 1, wherein the one or more modules are further executable by the one or more processors to cause the radio hardware to cease transmission of the transmission frame responsive to receipt of no acknowledgements from the receiver on the feedback channel.

5. The system of claim 1, wherein the one or more modules are further executable by the one or more processors to monitor the feedback channel for acknowledgements to determine whether the feed-forward channel is available.

6. The system of claim 1, wherein the one or more modules are further executable by the one or more processors to determine an error detection code for the portion of data and to cause the radio hardware to transmit the error detection code to the receiver.

7. One or more computer-readable storage devices comprising a plurality of instructions executable by one or more processors of a computing device to cause the computing device to:
transmit a preamble and a transmission frame including a plurality of symbols to a receiver on a feed-forward channel of an orthogonal frequency-division multiplexing (OFDM) wireless system, the plurality of symbols including at least a first subset of symbols and a second subset of symbols;
transmit cyclic redundancy check (CRC) information for the plurality of symbols to the receiver on a side channel of the OFDM system;
receive a negative acknowledgment from the receiver on a feedback channel of the OFDM system, the feedback channel different from the feed-forward channel, the negative acknowledgment indicating receipt of the first subset of symbols, the negative acknowledgment also indicating that the first subset of symbols includes at least one symbol error determined using at least a portion of the CRC information, the negative acknowledgement received by the computing device prior to an entirety of the transmission frame being transmitted by the computing device on the feed-forward channel; and
insert the second subset of symbols into the transmission frame upon receipt of the negative acknowledgement indicating that the first subset of symbols includes at least one symbol error, the second subset of symbols being a retransmission of the first subset of symbols.

8. The one or more computer-readable storage devices of claim 7, wherein the plurality of instructions are further executable to cause the computing device to cease transmission of the transmission frame upon a failure to receive any acknowledgements from the receiver on the feedback channel.

9. The one or more computer-readable storage devices of claim 7, wherein the plurality of instructions are further executable to cause the computing device to include metadata in the transmission frame indicating that the second subset of symbols is a retransmission of the first subset of symbols.

10. The one or more computer-readable storage devices of claim 7, wherein the plurality of instructions are further executable to perform rate adaptation on a subcarrier of the feed-forward channel during transmission of the transmission frame based on channel quality information included in the negative acknowledgment.

11. The system of claim 1, wherein the feed-forward channel and the feedback channel are channels of an orthogonal frequency-division multiplexing (OFDM) wireless system.

12. A system, comprising: one or more processors; and
memory storing instructions that, when executed by the one or more processors, cause the system to:
transmit a preamble and a transmission frame including a plurality of symbols to a receiver on a feed-forward channel of an orthogonal frequency-division multiplexing (OFDM) wireless system, the plurality of symbols including at least a first subset of symbols and a second subset of symbols;
transmit cyclic redundancy check (CRC) information for the plurality of symbols to the receiver on a side channel of the OFDM system;
receive a negative acknowledgment from the receiver on a feedback channel of the OFDM system, the feedback channel different from the feed-forward channel, the negative acknowledgment indicating receipt of the first subset of symbols, the negative acknowledgment also indicating that the first subset of symbols includes at least one symbol error determined using at least a portion of the CRC information, the negative acknowledgement received by the system prior to an entirety of the transmission frame being transmitted by the system on the feed-forward channel; and
insert the second subset of symbols into the transmission frame upon receipt of the negative acknowledgement indicating that the first subset of symbols includes at least one symbol error, the second subset of symbols being a retransmission of the first subset of symbols.

13. The system of claim 12, wherein the instructions further cause the system to cease transmission of the transmission frame upon a failure to receive any acknowledgements from the receiver on the feedback channel.

14. The system of claim 12, wherein the instructions further cause the system to include metadata in the transmission frame indicating that the second subset of symbols is a retransmission of the first subset of symbols.

15. The system of claim 12, wherein the instructions further cause the system to perform rate adaptation on a subcarrier of the feed-forward channel during transmission of the transmission frame based on channel quality information included in the negative acknowledgment.

16. The system of claim 12, wherein the retransmission of the group of one or more symbols does not require additional media contention by a sender.

17. The system of claim 12, wherein the feed-forward channel and the feedback channel utilize one or more of different frequencies bands, different time slots, or a single frequency band.

* * * * *